(12) United States Patent
Duong

(10) Patent No.: US 8,357,070 B2
(45) Date of Patent: Jan. 22, 2013

(54) METHOD OF COMPENSATING GEAR CARRIER BEARING MISALIGNMENT UNDER LOAD

(75) Inventor: Loc Quang Duong, San Diego, CA (US)

(73) Assignee: Pratt & Whitney, East Hartford, CT (US)

( * ) Notice: Subject to any disclaimer, the term of this patent is extended or adjusted under 35 U.S.C. 154(b) by 255 days.

(21) Appl. No.: 12/781,480

(22) Filed: May 17, 2010

(65) Prior Publication Data

US 2011/0277573 A1 Nov. 17, 2011

(51) Int. Cl.
*F16H 57/08* (2006.01)
(52) U.S. Cl. .................................. 475/331; 475/348
(58) Field of Classification Search .................. 475/331, 475/348
See application file for complete search history.

(56) References Cited

U.S. PATENT DOCUMENTS

| | | | |
|---|---|---|---|
| 6,183,388 B1 | 2/2001 | Hawkins | |
| 6,317,048 B1 | 11/2001 | Bomya | |
| 7,022,042 B2 | 4/2006 | Fleytman | |
| 7,104,918 B2 | 9/2006 | Mitrovic | |
| 8,066,096 B1 | 11/2011 | Francisco | |
| 8,206,259 B2 | 6/2012 | Lang | |
| 8,299,883 B2 | 10/2012 | Katsumata | |
| 2004/0023750 A1* | 2/2004 | Schulz et al. | 475/331 |
| 2005/0075211 A1* | 4/2005 | Fox et al. | 475/348 |
| 2009/0289460 A1* | 11/2009 | Bech | 290/55 |

* cited by examiner

*Primary Examiner* — Edwin A Young
(74) *Attorney, Agent, or Firm* — Stephen G. Mican

(57) ABSTRACT

A method of compensating for load-induced twisting of a gear assembly under load that includes a gear on a gear shaft, bearings on each side of the gear that support the gear shaft and a carrier fastened to a stationary support surface that mounts a proximal one of the bearings near the stationary support surface and mounts a distal one of the bearings away from the stationary support surface. The method includes the steps of determining the twisting deflection of a distal bearing axis of rotation for the distal bearing relative to a proximal bearing axis of rotation for the proximal bearing and offsetting the position of the distal bearing axis of rotation relative to the proximal bearing axis of rotation in the carrier opposite the determined deflection under no gear loading.

27 Claims, 5 Drawing Sheets

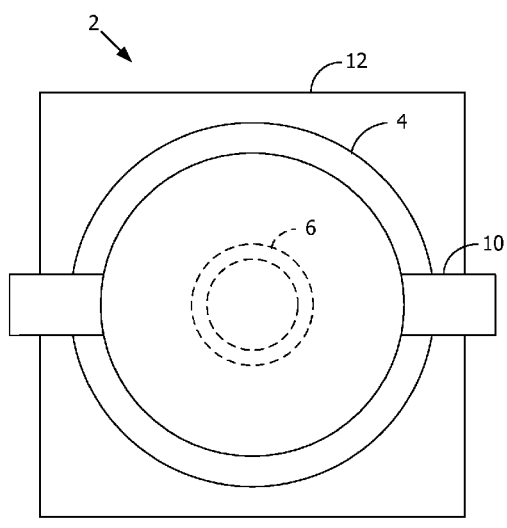
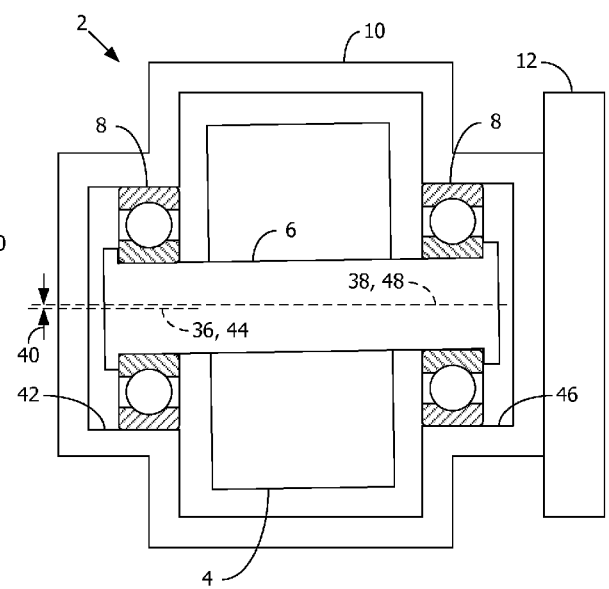
FIG. 5
FIG. 6

METHOD OF COMPENSATING GEAR CARRIER BEARING MISALIGNMENT UNDER LOAD

Figure 1:
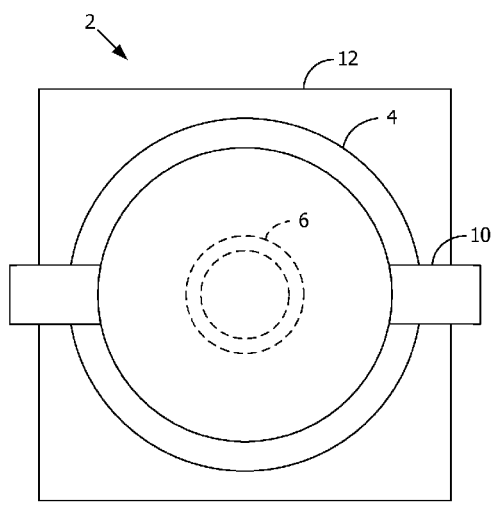
Figure 2:
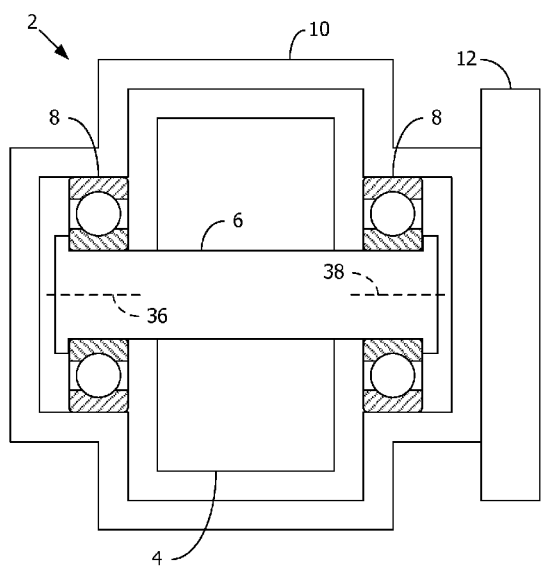
Figure 3:
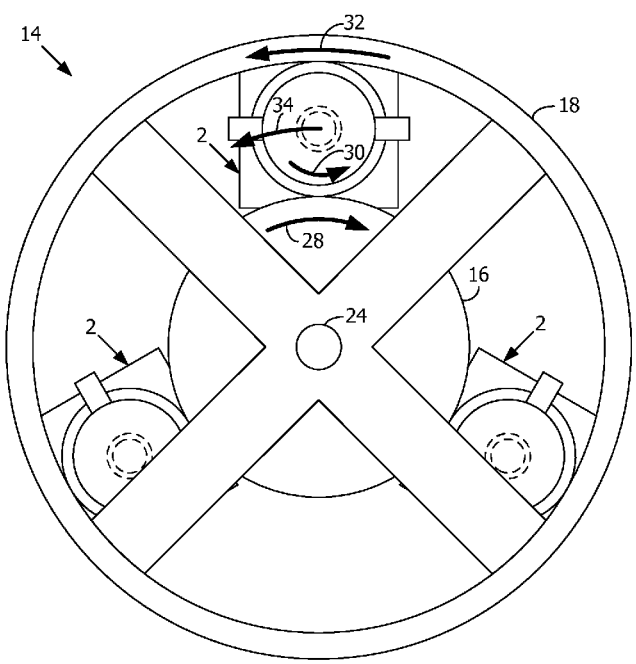
Figure 4:
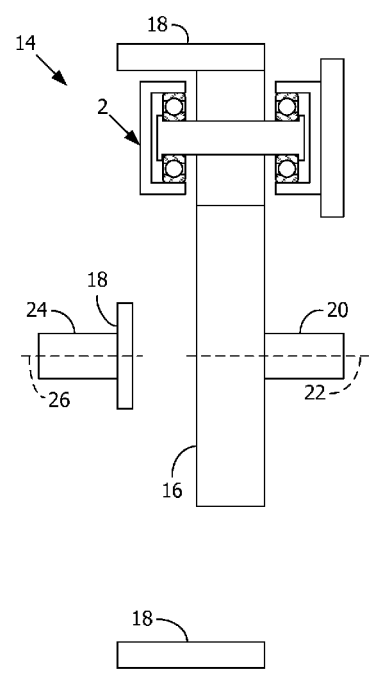
Figure 7:
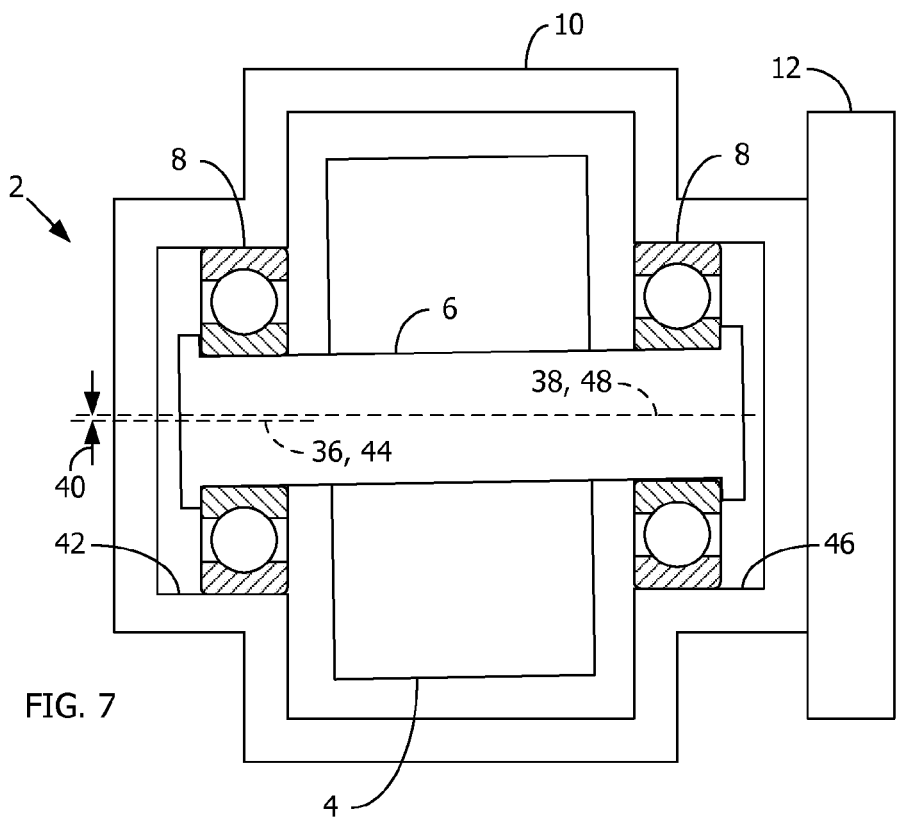
Figure 8:
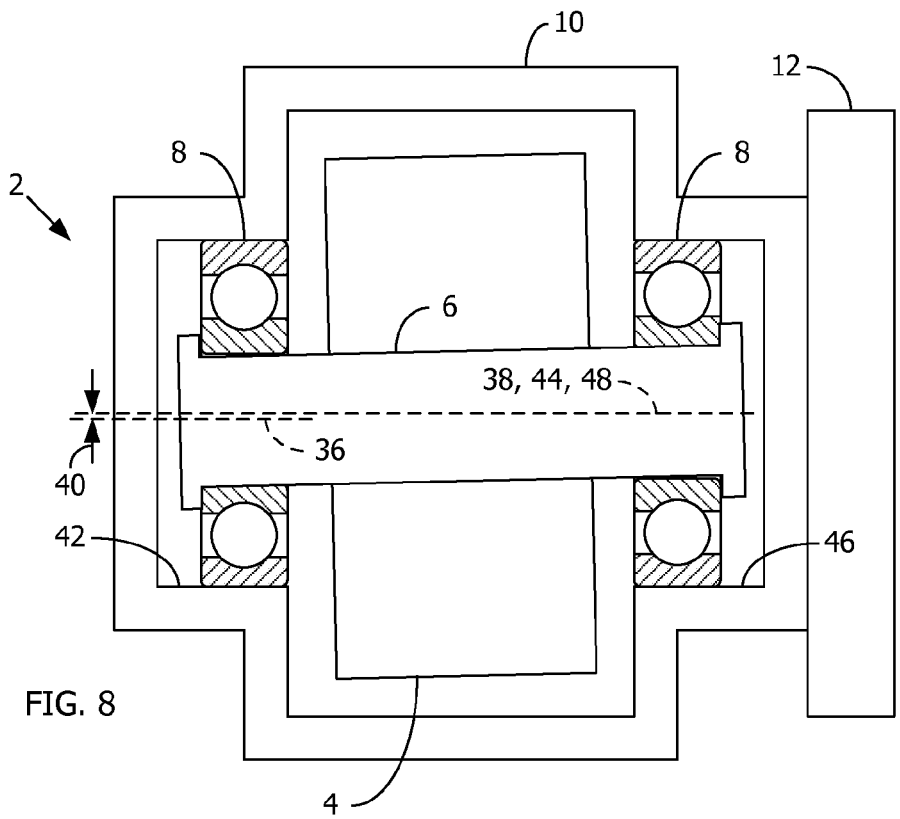
Figure 9:
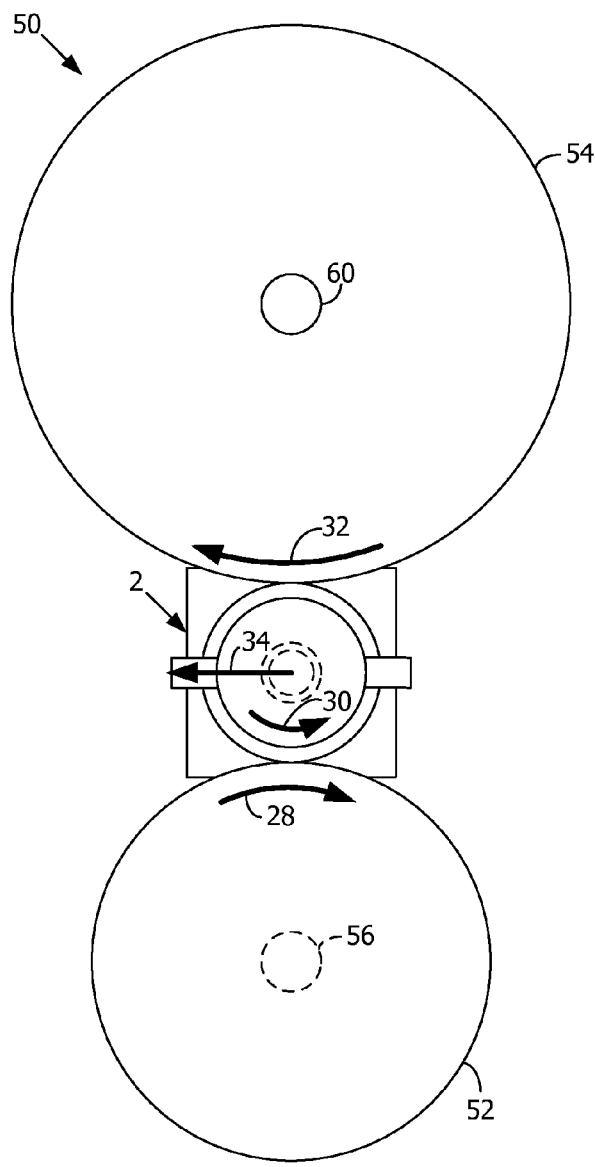
Figure 10:
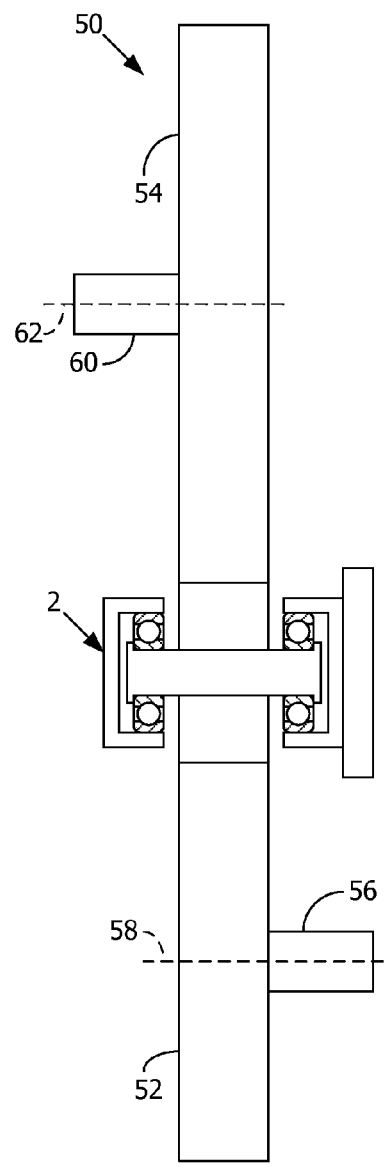

FIGS. 1 and 2 are end and cut-away top views, respectively, of an end-mounted gear assembly that incorporates at least one possible embodiment. FIGS. 3 and 4 are end and cut-away side views, respectively, of the end-mounted gear assembly of FIGS. 1 and 2 in a first gear train that incorporates at least one possible embodiment. FIGS. 5 and 6 are end and cut-away top views, respectively, of the end-mounted gear assembly of FIGS. 1 and 2 with a compensating offset between its distal bearing axis of rotation and its proximal bearing axis of rotation that incorporates at least one possible embodiment. FIG. 7 is a cut-away top view of the end-mounted gear assembly of FIGS. 5 and 6 that incorporates a first possible embodiment. FIG. 8 is a cut-away top view of the end-mounted gear assembly of the end-mounted gear assembly of FIGS. 5 and 6 that incorporates a second possible embodiment. FIGS. 9 and 10 are end and cut-away side views, respectively, of a second gear train that incorporates at least one possible embodiment.

Referring to FIGS. 1 and 2 together, a gear assembly 2 that incorporates at least one possible embodiment comprises a gear 4, a gear shaft 6 that extends through the gear 4, rolling bearings 8 on each side of the gear 4 that support the gear shaft 6 and a carrier 10 that mounts the bearings 8. The carrier 10 attaches to a stationary support surface 12 such that the carrier 10 mounts a proximal one of the bearings 8 near the stationary support surface 12 and a distal one of the bearings 8 away from the stationary support surface 12.

Referring to FIGS. 3 and 4 together, a first gear train 14 may comprise at least one of the gear assemblies 2. The gear 4 in each gear assembly 2 serves as a power transfer gear to transfer power from a drive gear, such as an inner gear 16 of the external type, to a load gear, such as an outer gear 18 of the internal type, both of which mesh with each gear 4. Of course, the outer gear 18 may alternately serve as the drive gear and the inner gear 16 may serve as the load gear.

When the inner gear 16 serves as a drive gear, it receives power on an inner gear shaft 20 with an inner gear shaft axis of rotation 22 and the outer gear 18 then serves as a load gear that transfers power to an outer gear shaft 24 with an outer gear shaft axis of rotation 26. The inner gear shaft axis of rotation 22 and the outer gear shaft axis of rotation 26 may be coincident, as shown in FIGS. 3 and 4, or different. This configuration of the first gear train 14, commonly known as an epicyclic gear train of the star system type, may include multiple gear assemblies 2, such as the three shown in FIGS. 3 and 4. The stationary surfaces 12 are part of a stationary carrier for the gear assemblies 2, commonly known in this configuration as star gears, between the inner gear 16, commonly known in this configuration as a sun gear, and the outer gear 18, commonly known in this configuration as a ring gear.

Because the outer gear 18 in this configuration of the first gear train 14 is of the internal type, it rotates in the same sense as the gear 4 in the gear assembly 2. For instance, when the inner gear 16 receives power that causes it to rotate in the clockwise sense, as represented by arrow 28, the gear 4 in the gear assembly 2 rotates in the anticlockwise sense, as represented by arrow 30 and the outer gear 18 then rotates in the anticlockwise sense, as represented by arrow 32.

The power that the gear assembly 2 transfers from the inner gear 16 to the outer gear 18 causes a twisting force, and resulting twisting deflection, as represented by arrow 34. The twisting force and deflection is a result of the end-mounted attachment of the carrier 10 to the stationary support surface 12. The twisting deflection is a result of a torsional deflection of the carrier 10 due to this twisting force on the distal one of the bearings 8 away from the support surface 12, which causes it to be out of alignment with the proximal one of the bearings 8 near the stationary support surface 12.

The resulting misalignment of the bearings 8 due to the twisting deflection of the carrier 10 under desired loading of the gear assembly 2 in normal operation of the first gear train 14 may cause undue wear of the gear 4 and even failure of the gear assembly 2. It is possible to determine the resulting twisting deflection as represented by arrow 34 by either calculation or measurement. Referring to FIGS. 5 and 6 together, it is then possible to offset the position of a distal bearing axis of rotation 36 of the distal one of the bearings 8 relative to a proximal bearing axis of rotation 38 of the proximal one of the bearings 8 under no loading of the gear assembly 2 to counteract the twisting deflection as represented by arrow 34. The introduced offset is in the opposite direction of the twisting deflection and of the same magnitude, as represented by offset 40.

Referring to FIG. 7, according to one possible embodiment of the gear assembly 2, the distal one of the bearings 8 has a distal mounting position 42 with a distal mounting axis 44 that is displaced from a proximal mounting position 46 with a proximal mounting axis 48 for the proximal one of the bearings 8 by the offset 40 under no loading of the gear 4. In this embodiment, the distal mounting axis 44 is coincident with the distal bearing axis of rotation 36 and the proximal mounting axis 48 is coincident with the proximal bearing axis of rotation 38. Under desired loading of the gear 4, the offset 40 compensates for the twisting deflection of the carrier 10 so that the distal bearing axis of rotation 36 and the proximal bearing axis of rotation 38 are in alignment with each other in normal operation.

Referring to FIG. 8, according to another possible embodiment of the gear assembly 2, the distal mounting axis 44 and the proximal mounting axis 48 are coincident under no loading of the gear 4, but the distal bearing axis of rotation 36 is displaced within the distal one of the bearings 8 so that it is offset from the distal mounting axis 44, and thus the proximal mounting axis 46 and the proximal bearing axis of rotation 38, by the offset 40. Alternatively, the proximal bearing axis of rotation 38 may have a displacement within the proximal one of the bearings 8 so that it has an offset from the proximal mounting axis 48, and thus the distal mounting axis 44 and the distal axis of rotation 36, by the offset 40.

Referring to FIGS. 9 and 10 together, a second gear train assembly 50 may comprise at least one of the gear assemblies 2. The gear 4 in each gear assembly 2 serves as a power transfer gear to transfer power from a drive gear, such as a first gear 52 of the external type, to a load gear, such as a second gear 54 of the external type, both of which mesh with each gear 4. Of course, the second gear 54 may alternately serve as the drive gear and the first gear 52 may serve as the load gear.

When the first gear 52 serves as a drive gear, it receives power on a first gear shaft 56 with a first gear shaft axis of rotation 58 and the second gear 54 then serves as a load gear that transfers power to a second gear shaft 60 with a second gear shaft axis of rotation 62. Since both the first gear 52 and the second gear 54 are of the external type, the first gear shaft axis of rotation 58 and the second gear shaft axis of rotation must necessarily be different as shown.

Since the first gear 52 and the second gear 54 are both of the external type, they rotate in the same sense. For instance, when the first gear 52 receives power that causes it to rotate in the clockwise sense, as represented by the arrow 28, the gear 4 in the gear assembly 2 rotates in the anticlockwise sense, as represented by the arrow 30 and the second gear 18 then rotates in the clockwise sense, as represented by the arrow 32. Just as with the first gear train 14, the gear assembly 2 experiences a twisting force and resulting twisting deflection, as represented by the arrow 34. The second gear train 50 may therefore also use either of the embodiments of the gear assembly 2 described in connection with FIGS. 7 and 8 to offset this twisting deflection under load.

The described embodiments as set forth herein represents only some illustrative implementations of the invention as set forth in the attached claims. Changes and substitutions of various details and arrangement thereof are within the scope of the claimed invention.

The invention claimed is:

1. A method of compensating for twisting of a gear assembly under load that includes a gear on a gear shaft, rolling bearings on each side of the gear that support the gear shaft and a carrier fastened to a stationary support surface that mounts a proximal one of the bearings near the stationary support surface and mounts a distal one of the bearings away from the stationary support surface that comprises the steps of:
   determining the twisting deflection of a distal bearing axis of rotation for the distal bearing relative to a proximal bearing axis of rotation for the proximal bearing under desired gear loading; and
   offsetting the position of the distal bearing axis of rotation relative to the proximal bearing axis of rotation in the carrier opposite the determined deflection under no gear loading.

2. The method of claim 1, wherein the step of offsetting the position of the distal bearing axis of rotation comprises the step of selecting mounting positions for the proximal and distal bearings that are offset from each other by the determined deflection.

3. The method of claim 1, wherein the step of offsetting the position of the distal bearing axis of rotation comprises the step of offsetting distal bearing axis of rotation within the distal bearing by the determined deflection relative to the proximal bearing axis of rotation within the proximal bearing.

4. The method of claim 1, further comprising the step of applying a desired load to the gear.

5. The method of claim 4, wherein the step of applying a desired load to the gear comprises the step of meshing the gear with a drive gear and a load gear.

6. The method of claim 5, wherein the step of meshing the gear further comprises meshing the gear with the drive gear and the load gear as the drive gear and the load gear have coincident axes of rotation.

7. The method of claim 5, wherein the step of meshing the gear with the drive gear and the load gear as the drive gear and the load gear have different axes of rotation.

8. The method of claim 7, wherein the step of meshing the gear further comprises meshing the gear with the drive gear and the load gear as the drive gear and the load gear have the same sense of rotation.

9. The method of claim 7, wherein the step of meshing the gear further comprises meshing the gear with the drive gear and the load gear as the drive gear and the load gear have opposite senses of rotation.

10. A gear assembly that comprises:
   a gear;
   a gear shaft that extends through the gear;
   rolling bearings on each side of the gear that support the gear shaft; and
   a carrier that mounts a proximal one of the bearings near a stationary support surface and mounts a distal one of the bearings away from the stationary support surface with an offset of a distal bearing axis of rotation for the distal bearing relative to a proximal bearing axis of rotation for the proximal bearing;
   wherein desired loading of the gear causes a deflection of the distal bearing axis of rotation relative to the proximal bearing axis of rotation relative to their respective positions under no gear loading and the offset of the distal bearing axis of rotation is approximately equal and opposite the deflection.

11. The gear assembly of claim 10, wherein the carrier comprises a proximal mounting for the proximal bearing that has a proximal mounting axis and a distal mounting for the distal bearing that has a distal mounting axis.

12. The gear assembly of claim 11, wherein the distal mounting axis has an offset from the proximal mounting axis to establish the distal bearing axis of rotation offset from the proximal bearing axis of rotation.

13. The gear assembly of claim 11, wherein the distal mounting axis is in general alignment with the proximal mounting axis and the distal bearing axis of rotation is displaced within the distal bearing relative to the proximal bearing axis of rotation within the proximal bearing to establish the distal bearing axis of rotation offset from the proximal bearing axis of rotation.

14. The gear assembly of claim 10, wherein the gear meshes with a drive gear and a load gear that have coincident axes of rotation.

15. The gear assembly of claim 14, wherein the gear is a star in an epicyclic gear train.

16. The gear assembly of claim 10, wherein the gear meshes with a drive gear and a load gear that have different axes of rotation.

17. The gear assembly of claim 16, wherein the drive gear and the load gear rotate in the same sense of rotation.

18. The gear assembly of claim 16, wherein the drive gear and the load gear rotate in opposite senses of rotation.

19. A gear train that comprises:
   a drive gear;
   a load gear;
   a power transfer gear that meshes with the drive gear and the load gear;
   a gear shaft that extends through the power transfer gear;
   rolling bearings on each side of the power transfer gear that support the gear shaft; and
   a carrier that mounts a proximal one of the bearings near a stationary support surface and mounts a distal one of the bearings away from the stationary support surface with an offset of a distal bearing axis of rotation for the distal bearing relative to a proximal bearing axis of rotation for the proximal bearing;
   wherein desired power transfer between the drive gear and the load gear by way of the power transfer gear causes a deflection of the distal bearing axis of rotation relative to the proximal bearing axis of rotation relative to their respective positions with no power transfer between the drive gear and the load gear by way of the power transfer gear and the offset of the distal bearing axis of rotation is approximately equal and opposite the deflection.

20. The gear train of claim 19, wherein the drive gear and the load gear have coincident axes of rotation.

21. The gear train of claim 20, wherein the gear train is an epicyclic gear train, one of the drive gear and load gear is a sun gear, the other of the drive gear and load gear is a ring gear and the power transfer gear is a star gear.

22. The gear train of claim 19, wherein the drive gear and the load gear have different axes of rotation.

23. The gear train of claim 22, wherein the drive gear and the load gear rotate in the same sense of rotation.

24. The gear train of claim 22, wherein the drive gear and the load gear rotate in opposite senses of rotation.

25. The gear train of claim 19, wherein the carrier comprises a proximal mounting for the proximal bearing that has a proximal mounting axis and a distal mounting for the distal bearing that has a distal mounting axis.

26. The gear train of claim 25, wherein the distal mounting axis has a displacement from the proximal mounting axis to establish the distal bearing axis of rotation offset from the proximal bearing axis of rotation.

27. The gear train of claim 25, wherein the distal mounting axis is in general alignment with the proximal mounting axis and the distal bearing axis of rotation is displaced within the distal bearing relative to the proximal bearing axis of rotation within the proximal bearing to establish the distal bearing axis of rotation offset from the proximal bearing axis of rotation.

* * * * *